United States Patent
Koutrika et al.

(10) Patent No.: US 9,019,548 B2
(45) Date of Patent: Apr. 28, 2015

(54) PRINT INTENT TYPE

(71) Applicant: Hewlett-Packard Development Company, L.P., Houston, TX (US)

(72) Inventors: Georgia Koutrika, Palo Alto, CA (US); Rares Vernica, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/749,134

(22) Filed: Jan. 24, 2013

(65) Prior Publication Data

US 2014/0204424 A1 Jul. 24, 2014

(51) Int. Cl.
G06F 15/00 (2006.01)
G06K 15/02 (2006.01)

(52) U.S. Cl.
CPC .................................. *G06K 15/02* (2013.01)

(58) Field of Classification Search
CPC ........................ H04N 1/32358; G06F 3/1288
USPC .......................................................... 358/1.16
See application file for complete search history.

(56) References Cited

U.S. PATENT DOCUMENTS

| 7,729,001 B2 | 6/2010 | Perronnin |
| 2004/0060010 A1* | 3/2004 | Bright et al. .................. 715/526 |
| 2012/0078710 A1 | 3/2012 | Cramer |

FOREIGN PATENT DOCUMENTS

JP 2003177901 A 6/2003

OTHER PUBLICATIONS

Herder, E, "Forward, Back, and Home Again Analyzing User Behavior on the Web", Mar. 2006.
Holub, M. et al, "Behavior Based Adaptive Navigation Support", Sep. 30, 2010.
Jingling, Z et al, "Study and Implementation of User Behavior Analysis", Feb. 7-10, 2010.
Kim, J.Y et al, "Characterizing Web Content, User Interests, and Search Behavior by Reading Level and Topic", Feb. 8-12, 2012.

* cited by examiner

*Primary Examiner* — Saeid Ebrahimi Dehkordy
(74) *Attorney, Agent, or Firm* — Tarolli, Sundheim, Covell & Tummino

(57) ABSTRACT

A system can include a page type classifier to determine a page type of a file. The system can also include a print intent identifier to map the page type of the file to a print intent subtype of the file. The print intent identifier can also map the print intent subtype of the file to a print intent type of the file. The print intent type of the file can characterize a reason to at least one of print and store the file.

20 Claims, 6 Drawing Sheets

Figure 1:
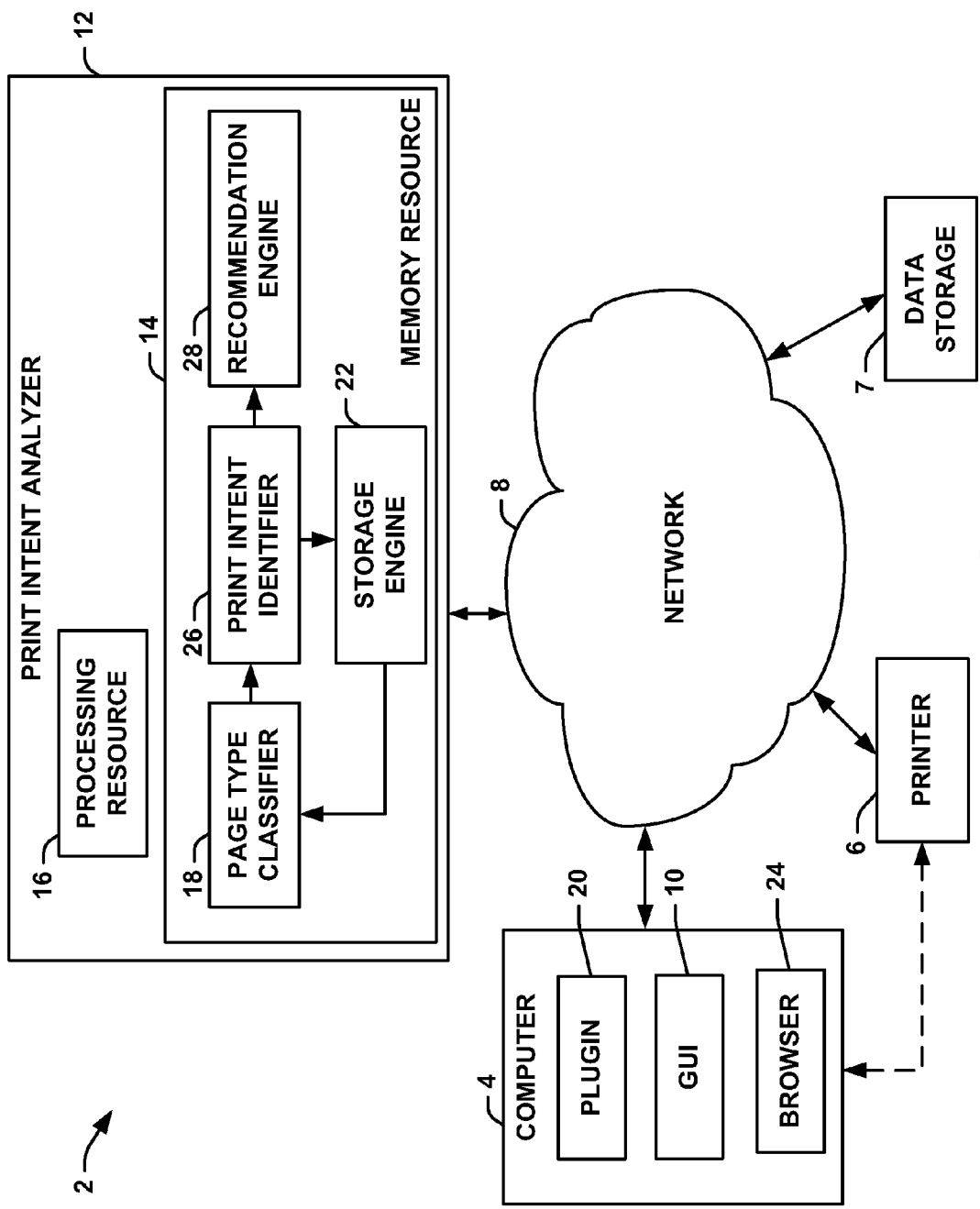

PRINT INTENT TYPE

BACKGROUND

Digital printing (or simply printing) refers to methods of creating a digital based image for a variety of media. The digital image can be sent to a printer. In computing, a printer is a peripheral which produces a representation of an electronic file (e.g., a document) on physical media such as paper or transparency film. Some printers are local peripherals connected directly to a nearby personal computer. Some printers are network printers with built-in network interfaces that can serve any user on the network. Some local printers are designed to support both local and network connected users concurrently. Some printers can print documents stored on memory cards or from digital cameras and scanners print.

Digital clipping (or simply clipping) can refer to method of creating a digital based image for storing in data storage. The data storage could be implemented as a volatile or non-volatile machine readable medium (e.g., random access memory, flash memory, a solid state drive, a hard disk drive or the like). Data storage can be offered by third parties (e.g., cloud storage) as network online storage where data can be stored in virtualized pools of storage.

BRIEF DESCRIPTION OF THE DRAWINGS

FIG. 1 illustrates an example of a system for determining print intent type of a given file.

FIG. 2 illustrates an example of a print intent analyzer.

FIG. 3 illustrates an example of a hierarchical graph depicting a relationship between a page type, a print intent subtype and a print intent type.

FIG. 4 illustrates a flowchart of an example method for determining a print intent type of a given file.

FIG. 5 illustrates another example of a print intent analyzer.

FIG. 6 illustrates another flowchart of an example method for determining a print intent type of a file.

DETAILED DESCRIPTION

In many instances, there is a relatively strong connection between user interest and a file selected for printing and/or storing. Such a correlation is typically greater than, for example, user interest in a webpage that is merely viewed on an electronic display. A system can include a print intent analyzer that can leverage the user interest by accurately determining a print intent of a given file that has been selected for printing and/or storing. The print intent can characterize a reason for printing and/or storing the given file.

A system can detect that the given file has been selected for printing and/or storage in a printable format. The given file could be, for example, a webpage, a document, an email or the like. The system can include a page type classifier that can identify a page type (e.g., a topic) of the given file. The page type could be based on a source and/or content of the given file. The system can also include a print intent identifier to determine a print intent subtype (e.g., a category) for the given file based on the page type of the given file. The print intent identifier could further determine a print intent type of the given file based on the print intent subtype. The print intent type of the given file could be for example, "archive", "read later" or "use later". The print intent type of the given file can be employed, for example, by a recommendation engine to generate supplemental content (e.g., content based on a single print job or a single storage job) and/or a composite to-print product (e.g., content based on a printing history of a user) based on the print intent type of the given file. By employing this system, the print intent type of the given file can be accurately determined thereby enhancing a probability that the supplemental content and/or the composite to-print product will be of interest to the user.

FIG. 1 illustrates an example of a system 2 for determining a print intent type of a given file. In some examples, the given file has been selected to be printed. In other examples, the given file has been selected to be stored in a printable format. The print intent type of the given file can characterize, for example, a reason for printing and/or storing the given file. The system 2 can include, for example, a computer 4, such as a laptop, a desktop computer, a tablet computer, a Smartphone or the like. The computer 4 can be employed to print material, such as files (e.g., documents) on a printer 6, such as a local printer or a network printer via a network 8. The network 8 could be implemented, for example as a public network (e.g., the Internet) a private network (e.g., a local area network) or a combination thereof. The printer 6 could be implemented, for example, as an inkjet printer, a laser printer or the like. In some examples, the computer 4 and the printer 6 could be integrated, such as in a smart printer.

As a further example, the computer 4 can include a graphical user interface (GUI) 10 that can be employed to initiate a print job to print the given file on the printer 6. A print job can be any file or set of files that has been submitted to be printed. Additionally or alternatively, the GUI 10 can be employed to initiate a storage job to store the given file on data storage 7. A storage job can be any file or set of files that has been clipped to be stored in the data storage 7. The data storage 7 could be implemented, for example, as a file system or database that can store the given file. In some examples, the data storage could be a cloud service (e.g., cloud storage). In such a situation, the term "cloud" can indicate a network fabric that includes a virtualized pool of computers that can be hosted, for example, by a cloud host (e.g., a third party). The given file could represent, for example, a webpage, a document, an email or the like. In many instances, there is a relatively strong connection between user interest and a file selected for printing and/or storing. Such a correlation is typically greater than, for example, user interest in a webpage that is merely viewed on an electronic display. The system 2 can include a print intent analyzer 12 that can leverage the user interest.

The print intent analyzer 12 can be implemented, for example, on a computer, such as a server. Additionally or alternatively, the print intent analyzer 12 can be integrated with the computer 4, the printer 6 and/or the data storage 7. The print intent analyzer 12 can include a memory resource 14 to store machine readable instructions. The memory resource 14 could be implemented, for example, as volatile memory (e.g., random access memory) non-volatile memory (e.g., a hard disk drive, a solid state drive, flash memory or the like). The print intent analyzer 12 can also include a processing resource 16 to access the memory resource 14 and execute the machine readable instructions. The processing resource 16 could include, for example, a processor core.

The memory resource 14 can include a page type classifier 18 that can detect that the computer 4 has selected the given file for printing and/or storing. For example, the page type classifier 18 can detect that a print job on the printer 6, which includes the given file, has been generated, thereby causing the printer 6 to print the given file. In another example, the page type classifier 18 can detect that a storage job for the data storage 7, which includes the given file, has been generated. In some examples, to detect the print job or storage job, the page type classifier 18 can receive a print message from a plugin 20 (e.g., an applet) installed on the computer 4 that characterizes the given file in the print job or storage job. In other examples, such as where the print intent analyzer 12 is integrated with a server (e.g., a printer server), the server can provide a similar print message that characterizes the given file in the print job or storage job. Such a characterization of the given file can include, for example, a source of the given file, which source could be implemented as a uniform resource locator (URL), such as where the given file corresponds to a webpage. In some examples, the given file can be included with the print message. In other examples, the given file can be omitted from the print message.

In some examples, the print message can be provided from a storage engine 22, wherein the print message can indicate that the given file has been selected (e.g., via the plugin 20) for storage in a printable format. In such a situation, the print message can also include the source of the given file and the given file itself. The print message can be similar to the print message provided by the plugin 20. Although the storage engine 22 is shown and described as being integrated with the print intent analyzer 12, in other examples, the storage engine 22 could be implemented on a separate server system and/or integrated with the computer 4. In still other examples, the storage engine 22 could be implemented as a cloud service.

In still other examples, the computer 4 can include a browser 24 (e.g., a web browser) that includes a browsing history. In some examples, the plugin 20 can provide the page type classifier 18 with access to the browser history. The browser history can include a list of web pages (including a URL) that have been selected to be printed. In the present examples described, the given file could be any one of the web pages included in the browser history that have been selected to be printed.

The page type classifier 18 can analyze the given file to determine a page type of the given file. The page type of the given file can be determined by the page type classifier 18 for example, by employing rules and/or models that have been learnt through a machine learning process. The page type of the given file can characterize a topic of content in the given file. For instance, the page type could be one of a set of page types selected from a receipt, boarding pass, an account summary, a news article, a chart, a map, a form, etc. In some examples, there can be hundreds or thousands of different page types. To determine the content of the given file, the page type classifier 18 can access the given file either by accessing the source of the given file or by retrieving the given file from the print message.

To determine the page type of the given file, the page type classifier 18 can assign a score for each page type in a set of page types to generate a set of candidate page types. The score for each of the set of page types can be based, for example, on the rules employed by the print intent identifier 26. The score could be, for example a confidence value implemented as a fractional value between zero ('0') and one ('1'). Additionally, depending on the rules employed to assign the scores for the set of page types, some (or all) of the page types in the set of page types can have multiple scores. In some examples, a page type in the set of page types with a score that is at or above a predetermined value (e.g., 0.51) can be a member of a set of candidate page types. Accordingly, the set of candidate page types can be a subset (e.g., a proper subset) of the set of page types.

The print intent identifier 26 can examine the score assigned to each of the set of candidate page types and select a given page type for the given file. The selection of the given page type can be based, for example, on a set of rules and/or on machine learning techniques to arbitrate between the scores assigned for each page type in the candidate page types. For instance, for scores above a predetermined value (e.g., 0.7 or more), the page type classifier 18 can examine the content of the given file to more accurately determine a probability that the given file is the given page type.

In some instances, the score of each of the set of page types may not meet the predetermined value, such that there are no members in the set of candidate page types. In such a situation, in some examples, a new page type can be generated for the given file. The new page type can be based, for example, on machine learning techniques by evaluating similar webpages that have been printed to determine the new page type. Additionally or alternatively, new rules can be added that can be employed to determine a score for the new page type. In other examples, the given page can be assigned a page type of "unclassified" by the page type classifier 18.

The page type of the given file and the given file can be provided to a print intent identifier 26. The print intent identifier 26 can examine the page type of the given file and map the page type to an associated print intent subtype, which can characterize a category of the content of the given file. In some examples, if the page type is a receipt, or a reservation, the given file can be mapped to a print intent subtype of "transactional". Alternatively, if the page type of the given file is assigned a page type of "news article" or "weather report", the given file can be mapped to a print intent subtype of "informational". Still further, in examples where the given file is assigned a page type of "game" or "form", the given file can be mapped to a print intent subtype of "fill-in". In examples where the page type is assigned "unclassified", the given file can be mapped to a print intent subtype of "unclassified". Additionally, in examples, where the page type is not mapped to a print intent subtype, the print intent identifier 26 can employ rules and/or machine learning techniques to generate a new print intent subtype for the given file or to map the given file to an already existing print intent subtype.

The print intent identifier 26 can map the given file to a print intent type based on the print intent subtype. The print intent type of the given file can represent a reason that the given file has been printed. For example, if the given file has a print intent subtype of "transactional", the given file can be mapped to a print intent type of "archive". An archive print intent type can indicate that the given file, upon printing and/or storing, is likely to be deposited by a user into long-term physical storage (e.g., a filing cabinet). Additionally, if the print intent subtype of the given file is "informational", the given file can be mapped to a print intent type of "read later" by the print intent identifier 26. A read later print intent type can indicate that the user is likely to read content in the given file after the given file has been printed. Further, if the print intent subtype of the given file is "fill-in", the print intent identifier 26 can map the given file to a print intent type of "use later". The use later print intent type can indicate that the user is likely to physically interact with (e.g., write on) the given file upon printing and/or storing and/or physically present (e.g., redeem) the given file to another person upon printing and/or storing.

In some examples, the print intent type of the given file can be provided to a recommendation engine 28. The recommendation engine 28 can employ the print intent type to generate supplemental content for the given file. The supplemental content can be, for example, printable content that can be selected based on the given file. In another example, the recommendation engine 28 can be employed to generate a composite to-print product that can be based on multiple instances of a given file being selected to be printed (e.g., a print history). The supplemental content and/or the composite to-print product can be provided to the computer 4 via the plugin 20. The computer 4 can output the supplemental content and/or the composite to-print product via the GUI 10, such that a user can elect or decline to print the supplemental content and/or the composite print product at the printer 6.

In other examples, the print intent type and the given file can be provided to the storage engine 22 that can store the given file in the data storage 7 in a printable format (e.g., the portable document format (PDF), HyperText Markup Language (HTML), a word processing document, or the like), which can be referred to as a printable page. In such a situation, the storage engine 22 can store multiple printable pages sorted (e.g., categorized) by the print intent type of each printable page. In some examples, if the given file is stored in the data storage 7, the given file may be printed at a later time or may not be printed.

By employment of the system 2, the print intent type of the given file can be accurately ascertained. Accordingly, the user experience with systems that rely on the print intent type of a given file to generate supplemental content, a composite print product or to store a printable page can be enhanced.

Figure 2:
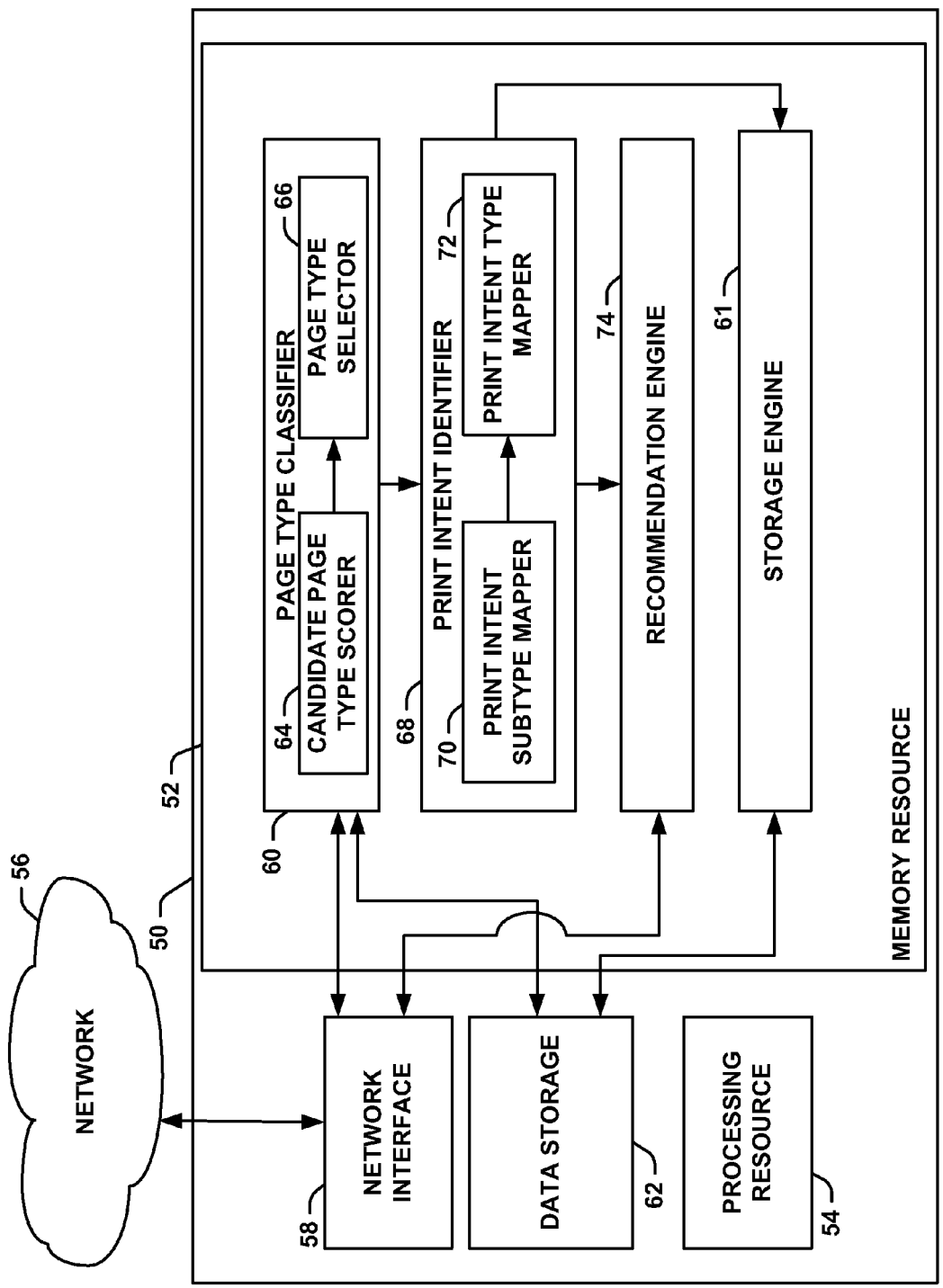

FIG. 2 illustrates an example of a print intent analyzer 50 that can be utilized to implement the print intent analyzer 12 illustrated in FIG. 1. The print intent analyzer 50 can include a memory resource 52 for storing machine executable instructions. The memory resource 52 could be a non-transitory machine readable medium. For instance, the memory resource 52 could be implemented, for example, as random access memory, flash memory, a hard disk, a solid state drive or a combination thereof. The print intent analyzer 50 can also include a processing resource 54 that can access the memory resource 52 and execute machine executable instructions. The processing resource 54 can include, for example, a processor core. The print intent analyzer 50 can be coupled to a network 56 (e.g., the Internet and/or a local area network) via a network interface 58, which could be implemented as a network interface card.

The memory resource 52 can include a page type classifier 60 that can detect that a given file has been selected for printing and/or storing. In such a situation, the given file can be already printed, be in the process of being printed or will be printed in the future (e.g., a print job or storage job that includes the given file has been generated). Alternatively, the page type classifier 60 can receive an indication from a storage engine 61 included in the memory resource 52 that the given file is to be stored in a printable format (e.g., PDF). In the present examples, the storage engine 61 is illustrated and described as being integrated with the print intent analyzer 50. However, in other examples, the storage engine 61 could be implemented externally and communicate with the print intent analyzer 50 via the network 56. In either situation, for purposes of simplification of explanation, it is presumed that the given file has been selected to be printed. The given file can represent a document, such as a web page, a word processing document, a spreadsheet, an email or the like. In some examples, the page type classifier 60 can receive a print message notifying the page type classifier 60 of the printing (or storing) of the given file. The print message can include, for example, a source of the given file (e.g., a URL). Moreover, in some examples, the print message can include the given file. In other examples the given file can be omitted from the print message.

The page type classifier 60 can be programmed to retrieve the given file. The given file can be retrieved by the page type classifier 60 either from the print message or from the source of the given file. Additionally, the page type classifier 60 can determine the page type of document that the given file includes. In some examples, the given file may be a private document or a public document. Examples of a private document include, for instance, a bank account statement, a web page with a secure URL (e.g., an https://www.example.com), word processing document or a spreadsheet. If it is determined that the given file is a private document, the print intent analyzer 50 can be designed such that no print intent type for the given file is determined. Accordingly, upon determining that the given file is a private document, the page type classifier 60 can cease further processing and discard the print message. In some examples, the determination as to whether the given file is a private document can be based on a set of page type rules extracted from data storage 62. The data storage 62 could be implemented, for example as volatile memory, non-volatile memory or a combination thereof. Moreover, although the data storage 62 is illustrated and described as being integrated with the print intent analyzer 50, in some examples, the data storage 62 could be implemented on the network 56 (e.g., cloud storage). In some examples, the print rules can include a list of websites and information characterizing a nature of the website. For instance, the page type rules may specify that if the given file's source is http://mail.example.com, that the given file is an email, and is therefore a private document.

Additionally or alternatively, the page type classifier 60 can employ a page type model stored in the data storage 62 to determine whether the given file is a private document. The page type model could be a model generated, for example, by machine learning techniques (e.g., a classifier, a neural network or the like). For instance, the page type model can specify keywords in a URL associated with the given file and/or keywords in the content of the given file to determine whether the given file is a private document.

If the page type classifier 60 determines that the given file is not a private document (e.g., the given file contains publically available information), a candidate page type scorer 64 of the page type classifier 60 can determine a set of candidate page types from a set of page types. Table 1 lists a set of page types and associated examples of each page type in the set of page types.

TABLE 1

| PAGE TYPE | EXAMPLES |
| --- | --- |
| RECEIPT | ONLINE PURCHASE TRANSACTION SUMMARY |
| RESERVATION | ONLINE RESTAURANT RESERVATION CONFIRMATION |
| CART | VIRTUAL SHOPPING CART CONTENTS; WISH LIST |
| ACCOUNT | ACCOUNT TOTAL; RUNNING TALLY |
| NEWS | NEWS ARTICLE |
| ENCYCLOPEDIA | ONLINE ENCYCLOPEDIA ARTICLE |
| ADVERTISEMENT | ADVERTISEMENT FOR GOODS/SERVICES |
| WEATHER | WEATHER REPORT; WEATHER MAP |
| CHART | PIE CHART; GRAPH |
| CALENDAR | ACTIVITY CALENDAR; PERSONAL CALENDAR |
| MAP | DRIVING MAP; PARK MAP |
| MANUAL | INSTRUCTION MANUAL; HANDBOOK |
| RECIPE | FOOD RECIPE |
| GAME | CROSS WORD PUZZLE; SUDOKU PUZZLE |
| FORM | FILLABLE APPLICATION; SIGN-UP SHEET |
| OFFER | COUPON |
| TRIP DOCUMENT | BOARDING PASS; ITINERARY |

The set of page types in Table 1 is not meant to be exhaustive. Instead, Table 1 includes examples of page types that could be employed as a portion of the set of page types. The candidate page type scorer 64 can assign a score (e.g., a confidence score) to each page type in the set of page types.

The score can be, for example, a fractional value between zero ('0') and one ('1'). In some examples, the score of each page type in the set of page types can be determined by machine learning techniques. Additionally or alternatively, the score of each page type in the set of page types can be determined by a set of rules. Equation 1 includes an example of a general form of a statement (e.g., a computer instruction) that could be employed to implement a rule for determining the score for each of the set of page types.

$$C := R1 \, LC \, R2 \ldots LC \, Rn, \text{Score}; \quad \text{Equation 1:}$$

wherein:

C is a given page type of the list of page types (e.g., News, Chart, etc.);

R1, R2 . . . Rn is a logical predicate for the given file;

n is an integer greater than or equal to one;

LC is a logical conjunction (e.g., AND, OR, XOR, NOT, etc.); and

Score is the score assigned to the given file for the given page type C if the logical statement has a value of '1' based on an evaluation of a combination of the predicates R1, R2 . . . Rn;

Equation 2 includes an example of Equation 1 for the page type "map":

$$\text{Map} := \text{contains}(URL, \text{'map'}) \text{ OR contains (title} \\ (URL), \text{'directions'})), 1; \quad \text{Equation 2:}$$

wherein:

contains(URL, 'map') returns a value of '1' if the string 'map' is located at the URL associated with the given file; and contains (title(URL), 'directions')) returns a value of '1' if the string 'directions' is located at a title field in the given file associated with the URL.

Equation 3 includes an example of Equation 1 for the page type "Weather":

$$\text{Weather} := \text{contains}(URL, \text{'meteo'}) \text{ OR contains} \\ (URL, \text{'weather'})), 1; \quad \text{Equation 3:}$$

wherein:

contains(URL, 'meteo') returns a value of '1' if the string 'meteo' (abbreviation for meteorology) is located at the URL associated with the given file; and contains (URL, 'weather')) returns a value of '1' if the string 'weather' is located at the URL associated with the given file.

Equations 4 and 5 include examples of Equation 1 for the page type "Recipe":

$$\text{Recipe} := \text{contains}(URL, \text{'recipe'}), 1; \quad \text{Equation 4:}$$

$$\text{Recipe} := \text{contains}(body(URL), \text{'ingredient'}) \text{ AND} \\ \text{contains}(body (URL), \text{'preparation time'}), 0.9; \quad \text{Equation 5:}$$

wherein:

contains(URL, 'recipe') returns a value of '1' if the string 'recipe' is included at the URL associated with the given file; and contains(body(URL), 'ingredient') AND contains(body (URL), 'preparation time') returns a value of '0.9' if the string 'ingredient' is included in the content of the given file associated with the URL and the string 'preparation time' is included in the content of the given file associated with the URL.

Logical statements similar to those employed in Equations 1-5 can be employed for each page type in the set of page types. Moreover, as shown with respect to Equations 4-5, more than one logical statement can be associated with the same page type in the set of page types. In such a situation, the candidate page type scorer 64 can assign multiple scores to a given page type of the set of page types. The candidate page type scorer 64 can evaluate the scores of each of the page types in the set of page types to determine a set of candidate page types. For instance, the candidate page type scorer 64 can include each page type of the set of page types that has a score greater than a predetermined value (e.g., 0.51) in the set of candidate page types. Accordingly, the set of candidate page type can be a subset (e.g., a proper subset) of the set of page types. In some examples, if no page type has a score that meets the predetermined value, the candidate page type scorer 64 can include page types in the set of page types with the highest score (still below the predetermined value). In other examples, if no page type has a score that meets the predetermined value, the candidate page type scorer 64 can indicate that the set of candidate page types is an empty set. The set of candidate page types and associated scores (including multiple scores for a given candidate page type in a set of candidate page types, if applicable) can be provided to a page type selector 66 of the page type classifier 60.

The page type selector 66 can arbitrate between the page types included in the set of candidate page types to select a page type for the given file. The selection of the page type of the given file can be based, for example, on machine learning techniques, and/or a set of rules. For instance, if a given page type in the set of candidate page types has a score of '1', while another page type in the set of candidate page types has a score of '0.7', the page type selector 66 can select the given page type as the page type for the given file. In another example, if a given page type in the set of candidate page types has scores of '0.8' and '1' while another page type in the set of candidate page types has a single score of '0.9', the page type selector 66 can select the given page type as the page type for the given file.

In still another example, if a given page type in the set of candidate page types has a score of '0.9' and while another page type in the set of candidate page types has also has a score of '0.9', the page type selector 66 can parse the content of the given file (which content can be stored at the source of the given file) and can apply additional rules and/or machine learning techniques to further differentiate between the given and the another page types in the set of candidate page types. Such additional rules and/or machine learning techniques can include, for example, calculating a probability for each of the given and the other page types, each probability indicating whether the page type for the given file should be matched with the given and the other page type included in the set of candidate page types. Since such additional rules and/or machine learning techniques may require intensive computer processing, reducing the set of page types to the set of candidate page types (by the candidate page type scorer 64) can increase an overall efficiency of the page type classifier 60.

Additionally, in some examples, the page type selector 66 may determine that no page type included in the candidate page types is satisfactory for the given file. In such a situation, in some examples, the page type selector 66 can select a page type of 'unclassified' for the given file. Alternatively, the page type selector 66 can employ machine learning techniques to generate a new page type based on an analysis of content of the given file as and/or content of similar files that have been selected for printing and/or storing. Still further, in some examples, new rules can be manually coded into the page type selector 66 and/or the candidate page type scorer 64 that can characterize the new page type.

The selected page type for the given file can be provided to a print intent identifier 68 that can be stored in the memory resource 52. The print intent identifier 68 can include a print intent subtype mapper 70 that can map the page type of the given file to a print intent subtype. The print intent subtype can characterize a category of the given file. Table 2 lists a mapping of a print intent subtype for each page type included in Table 1.

TABLE 2

| PAGE TYPE | PRINT INTENT SUBTYPE |
| --- | --- |
| RECEIPT | TRANSACTIONAL |
| RESERVATION | TRANSACTIONAL |
| CART | SUMMARY |
| ACCOUNT | SUMMARY |
| NEWS | INFORMATIONAL |
| ENCYCLOPEDIA | INFORMATIONAL |
| ADVERTISEMENT | INFORMATIONAL |
| WEATHER | INFORMATIONAL |
| CHART | TRACKING |
| CALENDAR | TRACKING |
| MAP | INSTRUCTIONAL |
| MANUAL | INSTRUCTIONAL |
| RECIPE | INSTRUCTIONAL |
| GAME | FILL-IN |
| FORM | FILL-IN |
| OFFER | REDEEMABLE |
| TRIP DOCUMENT | REDEEMABLE |
| UNCLASSIFIED | UNCLASSIFIED |

In some examples, the page type of the given file may not be mapped to any print intent subtype. In such a situation, the print intent subtype mapper 70 can employ rules and/or machine learning techniques to generate a new print intent subtype for the given file. The print intent subtype of the given file can be provided to a print intent type mapper 72 of the print intent identifier 68.

The print intent type mapper 72 can map a print intent subtype to a print intent type. The print intent type can characterize a reason that the given file has been selected for printing and/or storing. The print intent type could be, for example, "archive", "read-later" or "use-later". A print intent type of archive could indicate that the given file (upon printing and/or storing) is likely to be physically stored in long-term storage (e.g., a filing cabinet). A print intent type of read-later can indicate that the given file (upon printing and/or storing) is likely to be read by a user at a later time (e.g., a few second to several months later). A print intent type of use-later can indicate that the given file (upon printing and/or storing) is intended to be either physically interacted with (e.g., written on) or presented to another person (e.g., redeemed). Moreover, if the print intent subtype of the given file is unclassified, the print intent type mapper 72 can select a print intent type of unclassified for the given file. There is a high probability that a given subtype accurately corresponds to a given print intent type. Thus, instances where the subtype of the given file is not mapped to a print intent type, the print intent type mapper 72 can employ rules and/or machine learning techniques to map the subtype of the given file to a print intent type. Table 3 lists a mapping between the print intent subtype and the print intent type.

TABLE 3

| PRINT INTENT SUBTYPE | PRINT INTENT TYPE |
| --- | --- |
| TRANSACTIONAL | ARCHIVE |
| SUMMARY | ARCHIVE |
| INFORMATIONAL | READ-LATER |
| TRACKING | READ-LATER |
| INSTRUCTIONAL | READ-LATER |
| FILL-IN | USE-LATER |

TABLE 3-continued

| PRINT INTENT SUBTYPE | PRINT INTENT TYPE |
| --- | --- |
| REDEEMABLE | USE-LATER |
| UNCLASSIFIED | UNCLASSIFIED |

Figure 3:
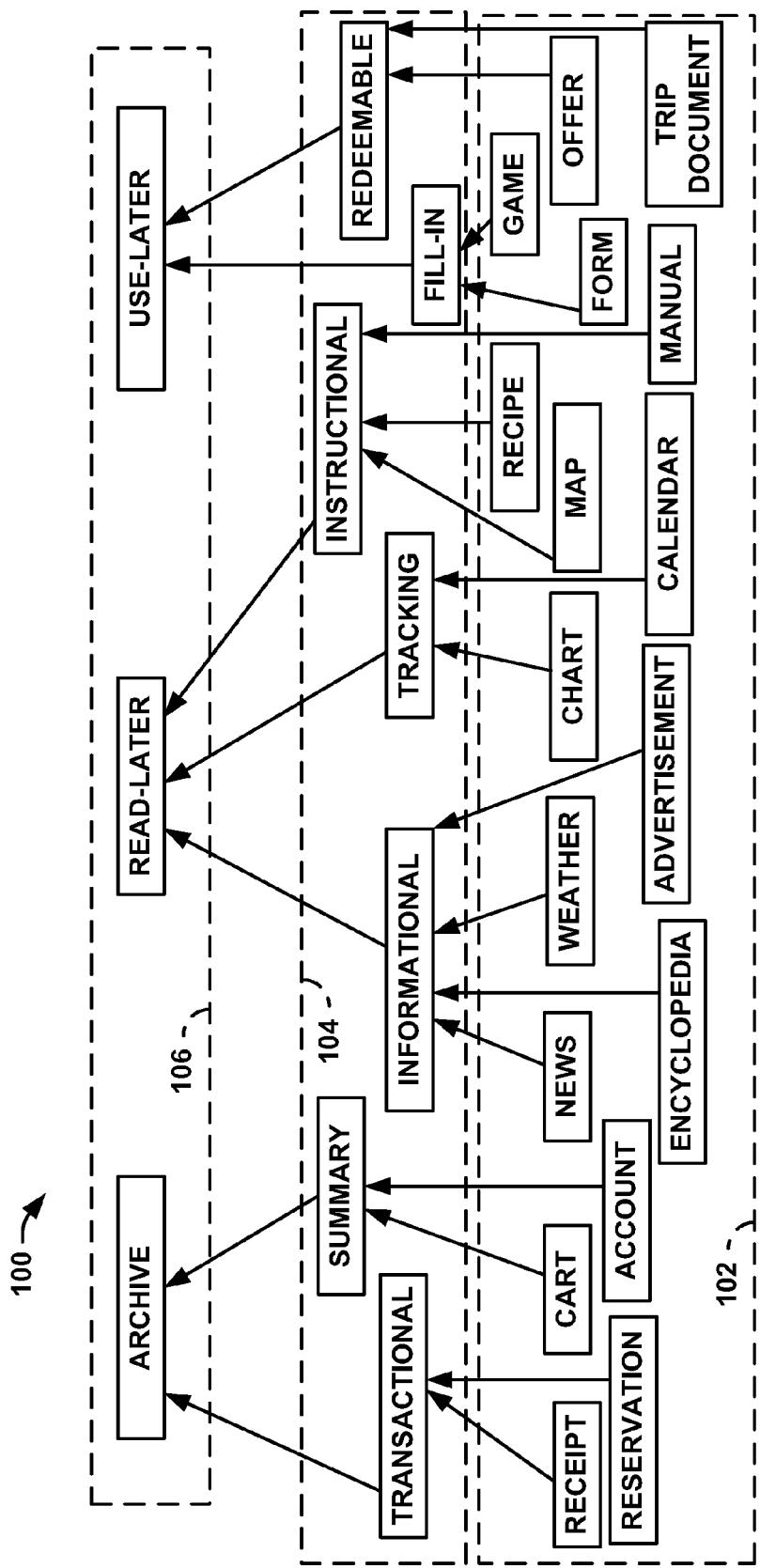

FIG. 3 illustrates a hierarchical graph 100 depicting a relationship between a page type, a print intent subtype and a print intent type for the given file. In the hierarchical graph 100, a lowest level 102 includes each page type included in Table 1. Moreover, a middle level 104 of the hierarchical graph 100 includes each print intent subtype included in Table 2. Still further, a highest level 106 of the hierarchical graph 100 includes each print intent type included in Table 3. The mapping listed in Tables 2 and 3 are depicted as arrows in the hierarchical graph 100.

Referring back to FIG. 2, upon determining a print intent type for the given file, in some examples, the print intent type and the given file can be provided to a recommendation engine 74 stored in the memory resource 52. The recommendation engine 74 can employ the print intent type of the given file to generate supplemental content and/or a composite to-print product for the user. The supplemental content can be implemented, for example, as a printable product (e.g. a printable file) that can be selected based on the given file. The composite to-print product can be implemented as a printable product (e.g., a printable file) generated from a printing and/or storing history of the user (e.g., a plurality of instances of the given file). The supplemental content and/or the composite to-print product can be provided to a computer (e.g., the computer 4 illustrated in FIG. 1) via the network interface 58 to be considered for printing and/or storing.

Alternatively, upon determining a print intent type for the given file, in some examples, the print intent type and the given file can be provided to the storage engine 61. In such a situation, the storage engine 61 can employ the print intent type of the given file to categorize a plurality of records in a file system and/or a database that can be stored, for example, in the data storage 62.

Figure 4:
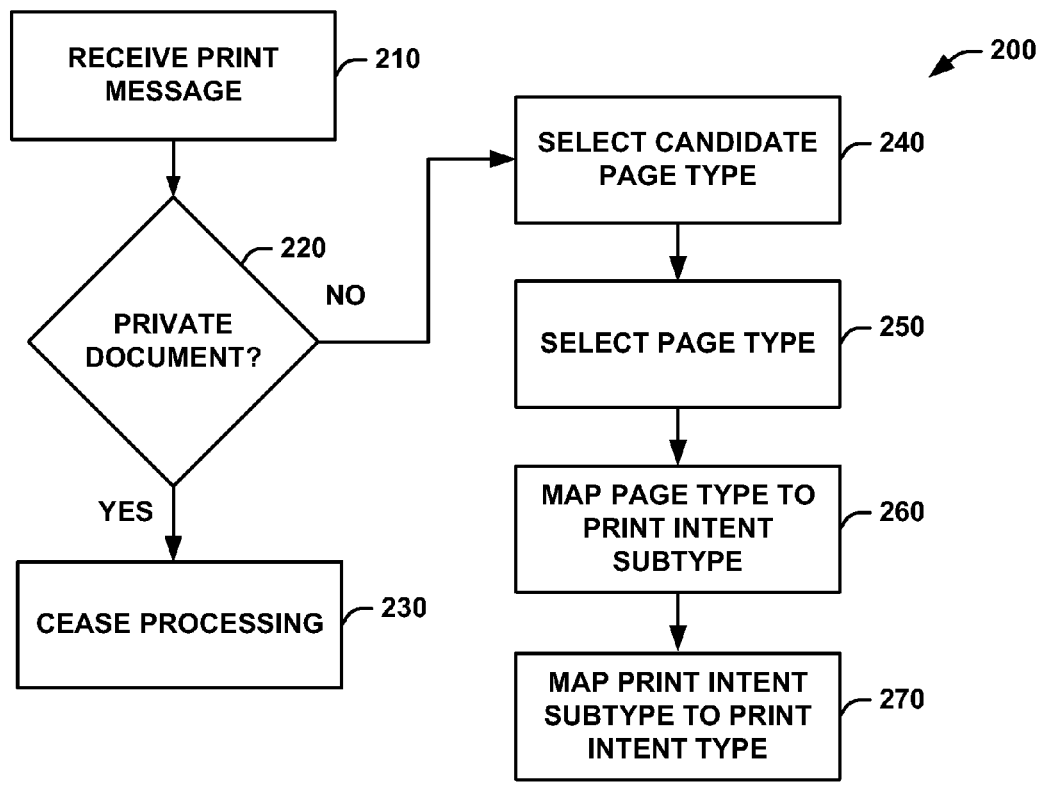
Figure 6:
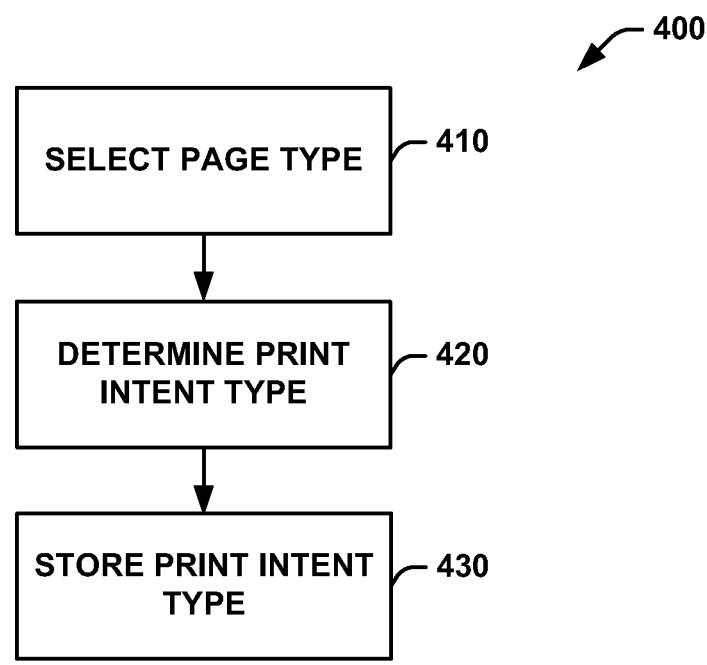

In view of the foregoing structural and functional features described above, example methods will be better appreciated with reference to FIGS. 4 and 6. While, for purposes of simplicity of explanation, the example methods of FIGS. 4 and 6 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 4 and 6 can be implemented as instructions stored in a non-transitory machine-readable medium. The instructions can be accessed by a processing resource and executed to perform the methods disclosed herein.

FIG. 4 illustrates a flow chart of an example method 200 for determining a print intent type of a given file. The method 200 could be executed, for example, by a print intent analyzer (e.g., the print intent analyzer 12 illustrated in FIG. 1 and/or the print intent analyzer 50 illustrated in FIG. 2). At 210, a print message can be received by a page type classifier (e.g., the page type classifier 18 illustrated in FIG. 1 and/or the page type classifier 60 illustrated in FIG. 2). The print message can be provided, for example, by a plugin installed in a computer, such as the plugin 20 illustrated in FIG. 1. Alternatively, the print message could be provided from a print server, a smart printer or a storage engine (e.g., the storage engine 22 illustrated in FIG. 1). The print message can include a notification that a given file has been selected for printing and/or storing or that the given file has been selected for storage by the storage engine in a printable format (e.g., PDF). The given file could be implemented, for example, as a webpage, a spreadsheet, a word processing document, an email or the like. The print message can include data identifying a source of the given file. In some examples, the given file can be included with the print message. In other examples, the given file can be omitted from the print message. At 220, a determination by the page type classifier can be made as to whether the given file is a private document, such as a bank statement, an email or the like, as described with respect to FIGS. 1 and 2. The determination can be based, for example, on content of the given file and/or on a source of the given file. For instance, if the source of the given file is a secure URL (e.g., "https://"), the given file may be determined to be a private document. If the determination at 220 is positive (e.g., YES) the method 200 can proceed to 230. If the determination at 220 is negative (e.g., NO), the method 200 can proceed to 240. At 230, processing of the given file is ceased, such that the print intent type for the given file is not determined.

At 240, the page type classifier can select a set of candidate page types for the given file from a set of page types. The selection of the set of candidate page type could be based, for example, on a score assigned to each of the set of page types, wherein the score can be based on a source of the given file and/or contents of the given file, as explained herein. Each page type in the set of page types can represent, for example, a topic of the given file. At 250, a page type for the given file can be selected from the set of candidate page types for the given file based on the score associated with each of the candidate page types in the set of candidate page types and/or on rules and/or machine learning techniques, as explained herein.

At 260, a print intent identifier (e.g., the print intent identifier 26 illustrated in FIG. 1) can map the page type of the given file to a print intent subtype for the given file. The print intent subtype can characterize a category of the given file. At 270, the print intent identifier can map the print intent subtype to the print intent type for the given file.

By utilization of the method 200, the print intent type can be employed for generation of supplemental content and/or a composite to-print product. Alternatively, the print intent type of the given file can be employed to categorize a printable format of the given file (e.g. a printable page) in a file system and/or a database (e.g., in the data storage 7 illustrated in FIG. 1). Moreover, a user's experience can be enhanced since the print intent type of the given file can be accurately determined.

Figure 5:
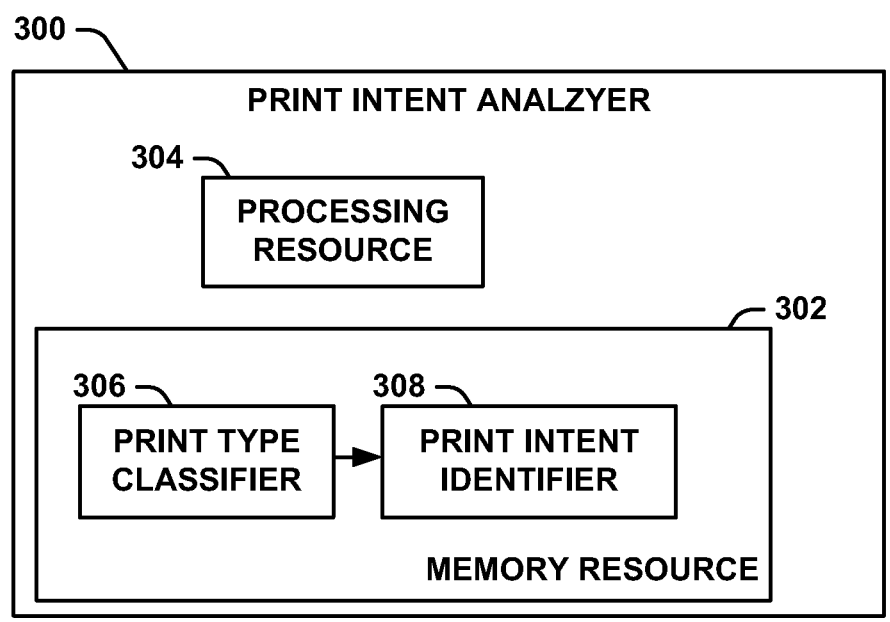

FIG. 5 illustrates another example of a print intent analyzer 300 that can be employed to determine a print intent type of a file. The print intent analyzer 300 could be employed for example to implement the print intent analyzer 12 illustrated in FIG. 1. The print intent analyzer 300 can include a memory resource 302 (e.g., volatile or non-volatile memory) that can be employed to store machine readable instructions. The memory resource 302 could be a non-transitory machine readable medium. The print intent analyzer 300 can also include a processing resource 304 (e.g., a processor core) that can access the memory resource 302 and execute the machine readable instructions. The memory resource 302 can include a page type classifier 306 to determine a page type of the file. The memory resource 304 can also include a print intent identifier 308 to map the page type of the file to a print intent subtype of the file. The print intent identifier 308 can also map the print intent subtype of the file to a print intent type of the file. The print intent type of the file can characterize a reason to at least one of print and store the file.

FIG. 6 illustrates another flowchart of an example method 400 for determining a print intent type of a file. The method could be implemented, for example, by the print intent analyzer 12 illustrated in FIG. 1. At 410 a page type for a file can be selected (e.g., by the page type classifier 18 illustrated in FIG. 1) from a plurality of page types. The page type of the file can characterize a topic of content included in the file. At 420, a print intent type of the file can be determined (e.g., by the print intent identifier 26 illustrated in FIG. 1) based on the page type of the file. The print intent type of the file can characterize a reason to at least one of print and store the file. At 430, the print intent type of the file can be stored (e.g., by the print intent identifier 26 of FIG. 1) in a memory (e.g., the memory resource 14 illustrated in FIG. 1).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium having machine executable instructions comprising:
   a pagetype classifier to determine a page type of a file from content of the file;
   a print intent identifier to:
      map the page type of the file to a print intent subtype of the file, the print intent subtype corresponding to a category of the page type; and
      map the print intent subtype of the file to a print intent type of the file, the print intent type of the file characterizing a reason to at least one of print and store the file, the reason related to a predicted intended future usage of the file by a user, the print intent type determined directly from the print intent subtype.

2. The non-transitory computer readable medium of claim 1, wherein the file has been selected to be at least one of printed and stored.

3. The non-transitory computer readable medium of claim 1, wherein the page type of the file characterizes a topic of content included in the file.

4. The non-transitory computer readable medium of claim 1, wherein the page type classifier further comprises a candidate page type scorer to:
   determine a score for each page type in a set of page types indicating a likelihood that each page type is a given page type of the file; and
   determine a set of candidate page types for the file based on the score for each of the set of page types.

5. The non-transitory computer readable medium of claim 4, wherein the score for each page type in the set of page types is based on a source of the file and wherein the score characterizes a confidence value corresponding to the likelihood that each page type is the given page type of the file.

6. The non-transitory computer readable medium of claim 4, wherein the page type classifier further comprises a page type selector to select the page type for the file from the set of candidate page types for the file.

7. The non-transitory computer readable medium of claim 6, wherein the page type selector is further to examine content in the file to select the page type for the file.

8. The non-transitory computer readable medium of claim 6, wherein the page type selector to calculate a probability for each of a given and another page types in the set of candidate page types for the file that the file should be matched with the given page type and the another page type.

9. The non-transitory computer readable medium of claim 1, wherein the print intent subtype of the file characterizes a category of content included in the file.

10. The non-transitory computer readable medium of claim 1, wherein the print intent type of the file is archive, readlater or uselater.

11. The non-transitory computer readable medium of claim 1, wherein the machine executable instructions further comprise a recommendation engine to generate one of supplemental content and a composite to-print product based on the print intent type of the file, wherein the supplemental content comprises a printable file based on content of the file and the composite to-print product comprises a printable file based on a print history of a user.

12. The non-transitory computer readable medium of claim 1, wherein the machine executable instructions further comprise:
a storage engine to store the file in a file system;
wherein the file is in a printable format; and
wherein the file is categorized in the database by the print intent type of the file.

13. The non-transitory computer readable medium of claim 1, wherein the print intent identifier maps the page type and maps the print intent subtype without user interaction.

14. The non-transitory computer readable medium of claim 1, wherein the pagetype classifier determines the page type of the file by examining the content of the file for a plurality of keywords.

15. The non-transitory computer readable medium of claim 1, wherein the print intent subtype is mapped on a one-to-many basis to the page type, such that a plurality of different page types map to a same print intent subtype.

16. The non-transitory computer readable medium of claim 15, wherein the print intent type is mapped on a one-to-many basis to the print intent subtype, such that a plurality of different print intent subtypes map to a same print intent type.

17. A method comprising:
selecting a page type for a file from a plurality of page types, wherein the page type characterizes a topic of content included in the file;
determining a print intent subtype of the file from the page type of the file, the print intent subtype corresponding to a category of the page type;
determining a print intent type of the file from the print intent subtype of the file, wherein the print intent type of the file characterizes a reason to at least one of print and store the file, the reason related to a prediction as to why a user desires to print the file, the print intent type determined directly from the print intent subtype; and
storing the print intent type of the file in a memory.

18. The method of claim 17, further comprising mapping the page type of the file to a print intent subtype of the file, wherein the print intent subtype characterizes a category of the content included in the file.

19. A system comprising:
a memory resource to store machine readable instructions; and
a processing resource to execute the machine readable instructions, the machine readable instructions comprising:
a page type classifier comprising:
a candidate page type scorer to:
determine a score for each page type in a set of page types; and
determine a set of candidate page types for a file based on the score for each of the set of page types, wherein the score for each page type in the set of page types is based on a source of the file and wherein the score characterizes a confidence value; and
a page type selector to select a page type for the file from the set of candidate page types for the file, wherein the page type of the file characterizes a topic of content included in the file;
a print intent identifier comprising:
a print intent subtype mapper to map the page type of the file to a print intent subtype of the file, the print intent subtype corresponding to a category of the page type; and
a print intent type mapper to map the print intent subtype of the file to a print intent type of the file, wherein the print intent type of the file characterizes a reason to at least one of print and store the file, the reason being one or more of a predicted intended future usage of the file by a user and a prediction as to why the user desires to print the file, the print intent type determined directly from the print intent subtype.

20. The system of claim 19, wherein the confidence value corresponds to a likelihood that each page type is a given page type of the file.

* * * * *

UNITED STATES PATENT AND TRADEMARK OFFICE
CERTIFICATE OF CORRECTION

| | | |
|---|---|---|
| PATENT NO. | : 9,019,548 B2 | Page 1 of 1 |
| APPLICATION NO. | : 13/749134 | |
| DATED | : April 28, 2015 | |
| INVENTOR(S) | : Georgia Koutrika et al. | |

It is certified that error appears in the above-identified patent and that said Letters Patent is hereby corrected as shown below:

Claims

In column 13, line 19 approx., in Claim 11, delete "1,wherein" and insert -- 1, wherein --, therefor.

Signed and Sealed this
Sixth Day of October, 2015

Michelle K. Lee
*Director of the United States Patent and Trademark Office*